(12) United States Patent
Sundareson

(10) Patent No.: US 11,023,732 B2
(45) Date of Patent: Jun. 1, 2021

(54) UNSUPERVISED CLASSIFICATION OF GAMEPLAY VIDEO USING MACHINE LEARNING MODELS

(71) Applicant: NVIDIA Corporation, San Jose, CA (US)

(72) Inventor: Prabindh Sundareson, Bangalore (IN)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/459,957

(22) Filed: Jul. 2, 2019

(65) Prior Publication Data

US 2020/0410241 A1 Dec. 31, 2020

Related U.S. Application Data

(60) Provisional application No. 62/868,654, filed on Jun. 28, 2019.

(51) Int. Cl.
| | |
|---|---|
| *G06K 9/00* | (2006.01) |
| *G06N 3/08* | (2006.01) |
| *A63F 13/86* | (2014.01) |
| *G06K 9/62* | (2006.01) |
| *A63F 13/67* | (2014.01) |

(52) U.S. Cl.
CPC .......... *G06K 9/00718* (2013.01); *A63F 13/67* (2014.09); *A63F 13/86* (2014.09); *G06K 9/00744* (2013.01); *G06K 9/6218* (2013.01); *G06N 3/08* (2013.01)

(58) Field of Classification Search
None
See application file for complete search history.

(56) References Cited

U.S. PATENT DOCUMENTS

| | | | | |
|---|---|---|---|---|
| 9,242,176 B2* | 1/2016 | Miura | ...................... | A63F 13/12 |
| 9,345,966 B2* | 5/2016 | Miura | ...................... | A63F 13/12 |
| 9,364,743 B2* | 6/2016 | Miura | ...................... | A63F 13/00 |

(Continued)

FOREIGN PATENT DOCUMENTS

WO 2018/140515 A1 8/2018

OTHER PUBLICATIONS

Platzer, Christian. "Sequence-based bot detection in massive multiplayer online games." In 2011 8th International Conference on Information, Communications & Signal Processing, pp. 1-5. IEEE, 2011.

(Continued)

*Primary Examiner* — Ronald Laneau
(74) *Attorney, Agent, or Firm* — Shook, Hardy & Bacon L.L.P.

(57) ABSTRACT

In various examples, potentially highlight-worthy video clips are identified from a gameplay session that a gamer might then selectively share or store for later viewing. The video clips may be identified in an unsupervised manner based on analyzing game data for durations of predicted interest. A classification model may be trained in an unsupervised manner to classify those video clips without requiring manual labeling of game-specific image or audio data. The gamer can select the video clips as highlights (e.g., to share on social media, store in a highlight reel, etc.). The classification model may be updated and improved based on new video clips, such as by creating new video-clip classes.

20 Claims, 6 Drawing Sheets

(56) References Cited

U.S. PATENT DOCUMENTS

| | | | |
|---|---|---|---|
| 2010/0035689 | A1 | 2/2010 | Altshuler et al. |
| 2012/0100910 | A1 | 4/2012 | Eichorn et al. |
| 2017/0282077 | A1 | 10/2017 | De La Cruz |
| 2018/0078862 | A1 | 3/2018 | Schleicher |
| 2018/0161675 | A1 | 6/2018 | Miron et al. |
| 2019/0313024 | A1 | 10/2019 | Selinger et al. |

OTHER PUBLICATIONS

Kaminsky, Ryan, Miro Enev, and Erik Andersen. "Identifying game players with mouse biometrics." University of Washington. Technical Report (2008).

Bernardi, Mario Luca, Marta Cimitile, Fabio Martinelli, and Francesco Mercaldo. "A time series classification approach to game bot detection." In Proceedings of the 7th International Conference on Web Intelligence, Mining and Semantics, p. 6. ACM, 2017.

"What influences keyboard input speed", May 31, 2018, https://blog.wooting.nl/whatinfluences-keyboard-speed/.

"Deep Unsupervised Multi-View Detection of Video Game Stream Highlights"—https://www.groundai.com/project/deep-unsupervised-multi-view-detection-of-video-game-stream-highlights/, 2018.

"Five video classification methods", 2018. https://blog.coast.ai/five-video-classification-methods-implemented-in-keras-and-tensorflow-99cad29cc0b5.

"Efficient k-means on GPU", https://www.clemenslutz.com/pdfs/damon_2018_efficient_k-means_on_gpus.pdf.

Guérin, Joris, Olivier Gibaru, Stéphane Thiery, and Eric Nyiri. "CNN features are also great at unsupervised classification." arXiv preprint arXiv:1707.01700 (2017).

Vailaya, Aditya, Anil K. Jain, and HongJiang Zhang. "Video clustering." Michigan State University, Technical Report (1996).

Notice of Allowance in U.S. Appl. No. 16/527,963 dated Apr. 7, 2020.

"XMP Specification Part 3—Storage in Files", Adobe Systems Incorporated, pp. 80 (2016).

"GoPro Time Lapse : Beginners Guide (step by step) Video Tutorial", Retrieved from Internet URL : https://projectgo.pro/gopro-time-lapse/, accessed on Aug. 5, 2019, pp. 40.

"YouTube Player API reference for iframe Embeds", Retrieved from Internet URL : https://developers.google.com/youtube/iframe_api_reference, accessed on Aug. 5, 2019, pp. 43 (Mar. 26, 2012).

International Search Report and Written Opinion received for PCT Patent Application No. PCT/2019/053647, dated Feb. 27, 2020, 15 Pages.

Notice of Allowance dated Jul. 16, 2020 in U.S. Appl. No. 16/527,963, 2 pages.

\* cited by examiner

UNSUPERVISED CLASSIFICATION OF GAMEPLAY VIDEO USING MACHINE LEARNING MODELS

CROSS-REFERENCE TO RELATED APPLICATIONS

This application claims the benefit of U.S. Provisional Application No. 62/868,654, filed on Jun. 28, 2019, which is hereby incorporated by reference in its entirety.

BACKGROUND

Determining whether particular sections of video, or video clips, include interesting content (e.g., more action) can be helpful in various contexts. For example, a player (e.g., "gamer") of a gaming application may use software to record his or her entire gameplay session (e.g., often 30 minutes to 1 hour or longer) to a local machine, and this often results in a large video file (e.g., several Gigabytes) that is difficult or time consuming to share, consumes a lot of storage, and might include some less interesting or unintended content. The gamer might wish to only share or save select clips of the larger video that are more interesting (e.g., video clips around 30 seconds presenting a higher concentration of action), instead of sharing or saving the entire video file.

A traditional system may identify and classify interesting video clips to assist gamers. To do so, the system may rely on an object-detection model that is trained to use specific visual data to detect objects in game video that may be associated with potentially interesting video clips. The system may then identify and classify the potentially interesting video clips based on the detected objects. However, the object-detection model may be relatively error prone and subject to mischaracterization. For example, the accuracy of the object-detection model often depends on the quality of the visual data, which may be highly variable, especially in streaming scenarios. Furthermore, because the object-detection model is trained using supervised learning, large sets of labeled game-specific training data may be required that may be difficult to generate, and/or may require manual labelling. Thus, a separate object-detection model is often required for each game or application. Moreover, many games are frequently updated with new content (e.g., new characters and new weapons) that has not been taken into account in the training data, which may require retraining or further reduce the accuracy of the object-detection model.

SUMMARY

Embodiments of the present disclosure relate to unsupervised classification of video clips of gameplay. Systems and methods are disclosed that identify video clips of interest in an unsupervised manner that is game-agnostic, and that group the interesting video clips into classes by clustering. Other video clips can then be classified based on comparing the video clips to the clusters.

In contrast to conventional systems, such as those described above, data (which may be game-agnostic) and that is associated with gameplay (e.g., user input data) may be analyzed to identify—in an unsupervised manner—durations of predicted interest from a video of a gameplay session (live or recorded) that may be highlight worthy. This unsupervised approach may be used to select clips to train a classification model or to identify potentially interesting clips from a gameplay video.

Once training data is identified, the clips that are generated based on the durations of predicted interest may then be classified using unsupervised learning. To do so, features (e.g., feature vectors) of the video clips may be extracted by a trained feature extractor (e.g., Convolutional Neural Network) of a trained image classifier, and the features may then be clustered to identify classes. As the feature extractor has learned what image features are important to classification in a general sense, the features may be clustered into meaningful classes without relying on overly specific game content, such as identifying particular objects. In aspects of the present disclosure, video clips may be clustered on a per-frame basis. For example, to train a classification model, a number of frames might be selected from each video clip, and a feature vector of each frame might be clustered into groups, or clusters. The clusters may form the basis of classes, which may be assigned a label by a user or algorithm. The classification model may then be used to classify a video clip (e.g., from a live or recorded gameplay session). This may include for each frame of a plurality of frames used to classify a video clip, classifying the frame based on its similarity to a class or cluster, and assigning one or more classes to the overall video clip based on the classes assigned to the constituent frames. Classifying frames may include determining a similarity of the feature vector of the frames of the video clip to one or more feature vectors associated with a class or cluster (e.g., using a distance metric). This technique may also be used to identify new classes, such as by identifying feature vectors that fail to satisfy a distance threshold.

BRIEF DESCRIPTION OF THE DRAWINGS

The present systems and methods for unsupervised classification of video clips of gameplay is described in detail below with reference to the attached drawing figures, wherein.

DETAILED DESCRIPTION

Figure 1:
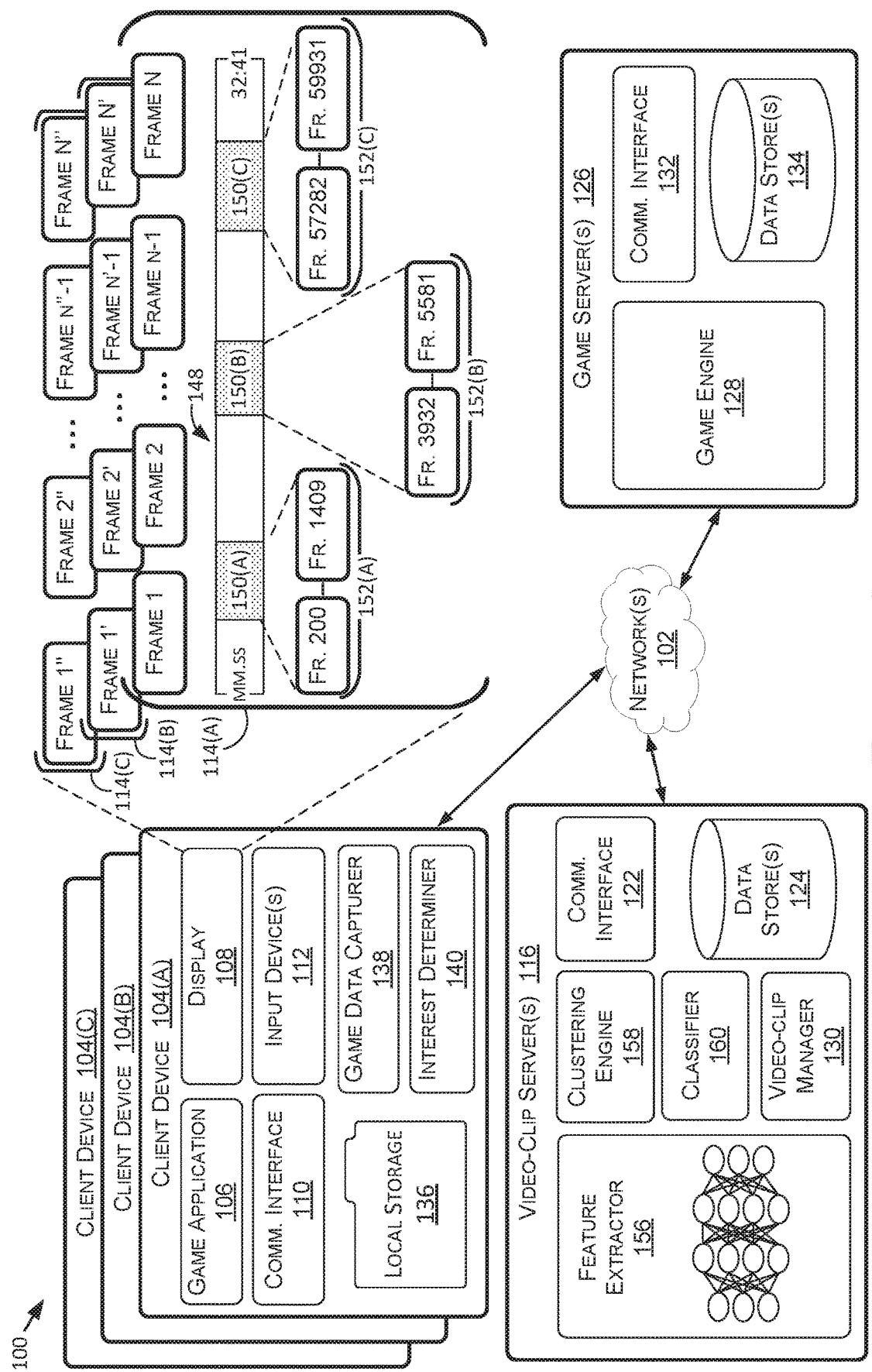
FIG. 1 is an example system diagram of a video classification system, in accordance with some embodiments of the present disclosure.

Systems and methods are disclosed related to unsupervised classification of video clips of gameplay. In contrast to traditional systems, the present disclosure provides for an unsupervised approach to identifying and classifying interesting video clips (e.g., video clips presenting a higher concentration of action). Game-agnostic visual data (e.g., data that does not require the presence or absence of particular objects such as weapons, interface elements, etc.) and that is associated with gameplay (e.g., user input data)

may be analyzed in an unsupervised manner to identify durations of predicted interest (e.g., potentially having a higher concentration of action) from a video of a gameplay session (live or recorded). This unsupervised approach may be used to select clips to train a classification model, which is trained to classify video clips using unsupervised learning, and to identify clips from a gameplay session that are then classified based on the model.

Various types of data that are game-agnostic might provide a basis to identify predicted durations of interest. In some embodiments input-device metrics may be used (e.g., keyboard strokes, mouse clicks, mouse movement, microphone input) to identify video clips from a gameplay session that might be highlight-worthy. For example, an input-device logger may record user input data that captures information about keyboard, mouse, and/or other input device usage. Various input-device metrics (e.g., game-specific, game-mode specific, etc.) may be generated from the user input data captured by the logger, such as fast cycles during which a continuous collection of keystrokes meet or exceed a threshold, keydowns per minute (KPM), action-key selection, and the like.

These input-device metrics may be used to identify time segments during the gameplay session that include a higher concentration or frequency of action. For example, a time segment may be identified as containing a high concentration of action or a high level of action activity based on the time segment having high KPMs and/or a high percentage of action-key selections. Further, these input-device metrics may be subjected to additional analysis in order to reduce potential noise when identifying higher-action time segments. For instance, an interest level algorithm could be applied to the input-device metrics that translates the metrics to a running activity measurement over time (e.g., using an equation that outputs an activity measurement for a given time using values of the input-device metrics).

Based on values of the interest level algorithm over time, time segments can be identified that correlate with potentially high concentrations or levels of in-game activity. For example, a time segment having data points (e.g., continuously) above a threshold (e.g., an average of values of the interest level algorithm) may be identified as correlating with a potentially highlight-worthy clip. Once the time segments are identified, video clips of the gameplay session correlating with these time segments may be generated, and these video clips may represent durations of predicted interest.

The input-device metrics and interest level algorithm are some examples of how data, other than game-specific visual data, may be used to identify durations of predicted interest. Using these techniques, video clips that likely include higher-concentrations or levels of action play than other portions of gameplay video can be identified automatically, without requiring large, initial, and potentially manually derived and labeled, training data or updating training data, and also without being subject to image data quality issues affecting object recognition.

Once training data, which includes video clips based on durations of predicted interest, has been generated, the training data may be used to train a classification model to classify video clips in an unsupervised manner. To do so, features (e.g., feature vectors) of the video clips may be generated on a per-frame basis. For example, a trained feature extractor of a trained image classifier may be used to generate the feature vectors. As the feature extractor has learned which image features are important to classification in a general sense, the features may be clustered into meaningful classes without relying on overly specific game content, such as identifying particular objects. In further embodiments, the present disclosure may train the classification model for video-clip classification by clustering a number of frames for each duration of predicted interest (e.g., 40 frames of each clip) into clusters using corresponding feature vectors. The clusters may then be labeled (e.g., by a user) or otherwise associated with classes (e.g., one class per cluster, one class for two particular clusters, etc.) to form a classification model.

Once the classification model is created, to classify a video clip, a number of frames (or adjacent sets of frames) of the video clip may be individually assigned to one of the classes based on a similarity of a feature vector of the frame to one or more feature vectors associated with the class (e.g., using a distance metric). For example, the distance metric may be between the feature vector of the frame and a feature vector that is representative of the class (e.g., a cluster center). A class may then be assigned to the video clip based on a quantity of the frames that are assigned to the class (e.g., the class that has the most frames assigned to it). This approach accounts for the dynamics of the features across the frames of the video clip which might be lost if all feature vectors for the frames were collapsed into a single feature vector used to classify the video clip.

The present disclosure further provides for the discovery of new classes not in the classification model, which may be used to update the classification model without having to re-cluster, thereby preserving computational resources. For example, if a frame is not sufficiently similar to any of the existing classes (e.g., the distance metric exceeds a threshold value for each class), the frame may be assigned to a new cluster and/or class, which may be used for future classification of video clips. As such, new classes may be defined by outliers from existing classes.

In further respects, once clusters are identified for a set of video clips, the clusters can be used to determine classes from clusters for other sets of video clips. For example, features (e.g., feature vectors) of clusters and/or classes (e.g., features of cluster centers) from multiple clusters of multiple sets of video clips may be clustered into groups, which may form the basis for new or updated classes. Using this approach, clusters or classes may be used across users for the same game or application (e.g., with each set of video clips corresponding to a different user and/or play session), without having cluster the entire data set at once to abstract the classes across multiple users and/or play sessions. Rather, features of clusters or classes (e.g., cluster centers) may function as a new feature for clustering in unsupervised training of video clip classification. Using this approach, clustering and classification could be performed on a per-game or application basis, on a per-user basis, across multiple games or applications, across different genres, per geographical region, per skill level, etc.

Once classes have been created based on the clustering, the classification model can used for various purposes. For example, video clips can be tagged or labeled (e.g., with the class labels) for storing and/or sharing (e.g., selectively by a user via a graphical user interface), such as by determining the similarity between feature vectors of the video clips and one or more feature vectors associated with the class (e.g., using a distance metric). The system may track user feedback on the classes provided by a gamer and/or an administrator to update the classes, such as the number of classes and/or clusters. For example, the system may merge clusters based on a user assigning video clips from different classes to the same class or otherwise indicating two classes should be the same class. As another example, the system may form multiple clusters from a cluster based on a user assigning a video clip of the cluster to a new class or otherwise indicating one class should be multiple classes. In this respect, the system can improve over time.

With reference to FIG. 1, FIG. 1 is an example system diagram of a video classification system 100, in accordance with some embodiments of the present disclosure. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The video classification system 100 may include, among other things, client devices 104(A), 104(B), and 104(C) (referred to collectively herein as "client devices 104"), a video-clip server 116, and/or a game server(s) 126. Although the client devices 104(A), 104(B), and 104(C) are illustrated in FIG. 1, this is not intended to be limiting. In any example, there may be any number of client devices 104. The video classification system 100 (and the components and/or features thereof) may be implemented using one or more computing devices, such as the computing device 600 of FIG. 6, described in more detail below.

Components of the video classification system 100 may communicate over network(s) 102. The network(s) may include a wide area network (WAN) (e.g., the Internet, a public switched telephone network (PSTN), etc.), a local area network (LAN) (e.g., Wi-Fi, ZigBee, Z-Wave, Bluetooth, Bluetooth Low Energy (BLE), Ethernet, etc.), a low-power wide-area network (LPWAN) (e.g., LoRaWAN, Sigfox, etc.), a global navigation satellite system (GNSS) network (e.g., the Global Positioning System (GPS)), and/or another network type. In any example, each of the components of the video classification system 100 may communicate with one or more of the other components via one or more of the network(s) 102.

The client devices 104 may include a smart phone, a laptop computer, a tablet computer, a desktop computer, a wearable device, a game console, a virtual reality system (e.g., a headset, a computer, a game console, remote(s), controller(s), and/or other components), a streaming device, (e.g., an NVIDIA SHIELD), a smart-home device that may include an intelligent personal assistant, and/or another type of device capable of supporting game play.

The client devices 104 may include a game application 106, a display 108, a communication interface 110, an input device(s) 112, local storage 136, a game data capturer 138, and an interest determiner 140. Although only a few components and/or features of the client device 104 are illustrated in FIG. 1, this is not intended to be limiting. For example, the client devices 104 may additional or alternative components, such as those described below with respect to the computing device 600 of FIG. 6.

The game application 106 may be a mobile application, a computer application, a console application, and/or another type of application. The game application 106 may include instructions that, when executed by a processor(s), cause the processor(s) to, without limitation, receive input data representative of user inputs to the one or more input device(s) 112, transmit the input data to the game server(s) 126, retrieve game data from memory or local storage, receive the game data using the communication interface 110 from the game server(s) 126, and cause display of the game on the display 108. In other words, the game application 106 may operate as a facilitator for enabling playing of a game associated with the game application on the client devices 104. The game application 106 may also include instructions that, when executed by a processor(s), cause the processor(s) to transmit data to, and receive data from, the video-clip server(s) 116. For example, the game application 106 may transmit to the video-clip server(s) 116 video recordings generated when games are played on the client devices 104, and receive from the video-clip servers(s) 116 video clips that have been classified by the video-clip server(s).

The game application 106 and/or patches or updates to the game application 106 may be downloaded from the game server(s) 126 or may be downloaded from another server(s), such as a server of a content delivery network (CDN). For example, the game server(s) 126 may be located in a different country or on a different continent, so to reduce the download time, the game application 106 and/or the patches or updates may be stored on different servers around the globe. As such, when the client devices 104 are downloading the game application 106 and/or the patches or updates, the client devices 104 may connect to a more local server that is part of the CDN, for example.

In some examples, the client devices 104 may render the game using the game application 106, while in other examples, the client devices 104 may receive display data (e.g., encoded display data, as described with respect to FIG. 5) and use the display data to display the game on the display 108. In some examples, a first client device, such as client device 104(A), may render the game while a second client device, such as client device 104(B), may receive the display data and display the game using the display data. In examples where the display data is received by the client device (e.g., where the client device 104 does not generate the rendering), the video classification system 100 may be part of a game streaming system, such as the game streaming system 500 of FIG. 5, described in more detail below.

The client device 104(A) may display, via the display 108, a plurality of game sessions over time, such as a game session 114(A), a game session 114(B), and a game session 114(C) (referred to collectively herein as "game sessions 114"). The game sessions 114 may include any number of game sessions participated in by users of the client device 104(A). Similarly, users of each of the client devices 104, in addition to the client device 104(A), may participate in any number of game sessions 114.

The display 108 may include any type of display capable of displaying the game (e.g., a light-emitting diode display (LED), an organic LED display (OLED), a liquid crystal display (LCD), an active matrix OLED display (AMOLED), a quantum dot display (QDD), a plasma display, an LED/LCD display, and/or another type of display). In some examples, the display 108 may include more than one display (e.g., a dual-monitor display for computer gaming, a first display for configuring a game and a virtual reality display for playing the game, etc.). In some examples, the display is a touch-screen display, such as a touch-screen of a smart phone, tablet computer, laptop computer, or the like, where the touch-screen is at least one of the input device(s) 112 of the client device 104.

The input device(s) 112 may include any type of devices that are capable of providing user inputs to the game. The input device(s) may include a keyboard, a mouse, a microphone(s), a touch-screen display, a controller(s), a remote(s), a headset (e.g., sensors of a virtual reality headset), and/or other types of input devices.

The communication interface 110 may include one or more components and features for communicating across one or more networks, such as the network(s) 102. The communication interface 110 may be configured to communicate via any number of network(s) 102, described herein. For example, to communicate in the video classification system 100 of FIG. 1, the client devices 104 may use an Ethernet or Wi-Fi connection through a router to access the Internet in order to communicate with the video-clip server(s) 116, the game server(s) 126, and/or with other client devices 104.

The local storage 136 may include any of a variety of computer-readable media. The computer-readable media may be any available media that can be accessed by the client device 104(A). The computer-readable media may include both volatile and nonvolatile media, and removable and non-removable media. By way of example, and not limitation, the computer-readable media may comprise computer-storage media and communication media. The local storage 136 may include additional or alternative components, such as those described below with respect to the memory 604 of FIG. 6.

General operations of the system 100 have been described, including rendering of the game sessions 114. Some additional aspects will now be described, including other operations that might be carried out in the course of rendering the gameplay sessions 114 or analyzing data generated as a result of the gameplay sessions 114. As described herein, game-session video data, which may also be referred to as "gameplay video") from the game sessions 114 may be used to generate video files and/or video clips associated with the game sessions 114. Among other things, the game-session video data might include a series of frames that, when sequentially played, provide a video replay of the respective game session and/or one or more portions thereof.

For example, the gameplay session 114(A) includes Frames 1 through N, and each frame may represent a still image presented by the display 108 in the course of rendering the gameplay session 114(A). Furthermore, FIG. 1 illustrates a timeline 148 associated with the gameplay session 114(A) that indicates a relative time designation at which each frame of the gameplay session 114(A) may be sequentially positioned. For illustrative purposes, time segments 150A, 150B, and 150C are depicted on the timeline 148, and each time segment is depicted as being associated with a respective set of frames, which make up a respective video segment of the game-session video data. For example, the time segment 150A is associated with frames 200 through 1409, which make up a video segment 152A; the time segment 150B is associated with frames 3932 through 4581, which make up a video segment 152B; and the time segment 150C is associated with frames 57282 through 59931, which make up a video segment 152C.

The game application 106 and/or the game data capturer 138 may include instructions that, when executed, record game-session video data (e.g., corresponding to Frames 1 through N) from gameplay sessions 114 and store the recorded game-session video data locally on the client device 104 (e.g., in local storage 136) or transmit the recorded game-session video data to the video-clip server 116 or the game server 126 to be stored in data stores(s) 124 and 134, respectively. In examples where the client device 104 does not generate the rendering (such as the game streaming system 500 of FIG. 5 described in more detail below), the game server(s) 126 might record and store the game-session video data or transmit the game-session video data to the video-clip server(s) 116 for storage in the data store(s) 124.

As explained herein, it may be desirable to identify clips from among the recorded game-session video data that include interesting content, such as clips during which a higher amount of user input was provided. Identifying clips including interesting content might be useful in various contexts, such as when generating training data to train a classification model as described herein and/or when providing clips for a gamer to share or store. As such, in a further embodiment, the system 100 may include the game data capturer 138, which may be useful for identifying interesting clips in an unsupervised manner.

The game data capturer 138 may be part of the game application 106 or may be part of a separate application (e.g., one or more system services, programs, etc.). The game data capturer 138 may be a component of the input device(s) 112 or may be executed by some other component of the client devices 104. The game data capturer 138 may include instructions that, when executed by a processor(s), cause the processor(s) to, without limitation, record or log game data, such as input-device usage data, video data, and/or other data associated with a gameplay session. Examples of input-device usage data includes data descriptive or representative of keyboard, mouse, or other input-device usage, and that is associated with one or more of the gameplay sessions 114. Examples of information that might be recorded include keyboard strokes, mouse clicks, mouse movement, microphone inputs, video-camera inputs, and/or inputs to the client devices 104 during the gameplay sessions 114. In addition, the game data capturer 138 may store timestamp information along with these inputs that correlates with timestamp information of the game-session video data (e.g., along the timeline 148).

The interest determiner 140 is generally configured to analyze game data of gameplay sessions to determine video clips that may be of interest to a user. This analysis may be performed on recorded game data (e.g., in the local storage 136), such as after completion of the game session, and/or in real-time as the gameplay sessions are occurring. The interest determiner 140 may be part of the game application 106 or may be part of a separate application (e.g., one or more system services, programs, etc.). In some examples, the interest determiner 140 is part of the same application as the game data capturer 138. To identify the interesting video clips, the interest determiner 140 may determine durations of higher levels (e.g., frequencies or concentrations) of action in the gameplay sessions based on the game data. For example, the game data of the gameplay sessions 114 may be used to identify time segments during the gameplay sessions 114 that include higher levels of action, and these durations or time segments may be referred to as "durations of predicted interest."

For example, a time segment within a gameplay session 114 may be identified by the interest determiner 140 as high action based at least in part on the time segment having high keydowns per minute (KPMs), a high percentage of action-key selections, and/or other input-device metrics. Further, these input-device metrics may be subjected to additional analysis in order to reduce potential noise when identifying higher-action time segments. For instance, an interest-level algorithm could be applied to the input-device metrics to translate the metrics into a running activity measurement over time. One such algorithm is a "HEAT" algorithm (High Energy Area Technique), which can be expressed with the following equation:

$$HEAT = \log(k*(A_{factor}*D)^2*K_c*S_{max}))$$

where, $A_{factor}$=High constant, if "Action" keys are present in the cycle. Else=1
D=Duration of "Fast Cycle"
Kc=# of keys in "Fast Cycle"
Smax=Max speed of press among keys in "Fast Cycle"
K=constant Based on values of the interest level algorithm over time (e.g., values of HEAT), time segments can be identified that correlate with potentially high in-game activity. For example, a time segment having data points (e.g., continuously) above a threshold (e.g., an average) may be identified as correlating with a potentially highlight-worthy clip. A start of the time segment may be based on when the running activity measurement exceeds the threshold and an end of the time segment may be based on when the running activity measurement falls below the threshold. A video clip may then be identified that corresponds to the time segment. For example, the video clip may be stored as a discrete file that captures the frames spanning the time segment 150A, and/or may be stored as metadata used to identify a region in the game-session video data that corresponds to the time segment 150A (e.g., using a start timestamp, an end timestamp, and/or a time duration).

As the interest determiner 140 does not need to be trained using labeled game-specific training data in order to identify interesting video clips, it may identify interesting video clips in an unsupervised manner. For example, if a new item is added to a game, because the interest determiner 140 does not need to rely on identifying specific in-game objects, the interest determiner 140 may still effectively identify the durations of predicted interest. While the HEAT algorithm described herein uses user inputs (e.g., input-device metrics) to quantify in game activity into an interest level, other types of data may be used in addition to or instead of the user inputs. For example, game-session visual and/or audio metrics could be used that correspond to in-game camera and/or field of view movement, color changes, audio volume, audio dynamics, and/or audio variation, etc. Also, while in some examples, the interest determiner 140 may identify a duration of predicted interest, which is then used to generate a video clip, in other examples the interest determiner 140 may analyze a video clip (generated using any suitable approach) to determine whether is it sufficiently interesting, such as by using an interest-level algorithm described herein (e.g., based on determining the average interest level of the clip is greater than a threshold).

As described herein, in examples where the display data is received by the client device (e.g., where the client device 104 does not generate the rendering), the video classification system 100 may be part of a game streaming system, such as the game streaming system 500 of FIG. 5, described in more detail below. In those embodiments, the client device(s) 104 send at least some of the user input to the game server(s) 126 in order to control the game(s) during the gameplay session(s) 114. Also, in some embodiments, the interest determiner 140 and/or the game data capturer 138 may be executed at least partially on the game server(s) 126 and/or the video-clip server(s) 116 on the server-side. Here, the interest determiner 140 and/or the game data capturer 138 may perform the same or similar operations described with respect to the client-side. For example, on the server-side, the game data capturer 138 may log user input data and the interest determiner 140 may determine time segments identified as durations of predicted interest.

Once the time segments are identified as durations of predicted interest, corresponding video segments from the video data of gameplay sessions 114 can be identified. For example, the interest determiner 140 can transmit timestamps, which correspond to the durations of predicted interest, to the game application 106, the game server(s) 126, and/or the video-clip server(s) 116. Any combination of these components may then use the timestamps to generate and/or identify discrete video clips from the game-session video data described above (e.g., stored in local storage 136 or data store(s) 124 or 134). For example, if a time segment that is identified as a duration of predicted interest corresponds with the time segment 150A, then a discrete video clip including the frames 200 through 275 (or a copy thereof) may be created, and the discrete video clip may correspond with the video segment 152A. The generated video clips may be based on the durations of predicted interest where the generated video clips correspond with time segments during which the in-game activity was deemed relatively high (as compared with other time segments during the gameplay session).

As described in other aspects of this disclosure, conventional approaches rely on object detection by analyzing game-specific visual data to identify and classify a clip that might include interesting content. But those techniques can be inconsistent based on varying image data quality and stale training sets that become outdated when games are updated. Furthermore, object detection often requires large labeled training sets that are resource intensive to create. In contrast, using approaches described herein, video clips may be identified in an unsupervised manner, which does not rely on identifying game-specific visual objects. Thus, the approach carried out by the video classification system 100 may be less subject to becoming stale when games are updated and does not require game-specific labeled training data. Furthermore, because the details of particular in-game objects need not be identified, the approach is less subject to inaccuracies resulting from poor image quality.

The video-clip server(s) 116 may include one or more servers for storing, trimming, classifying, and/or categorizing game-session video data from the game sessions 114. Although only a few components and/or features of the video-clip server(s) 116 are illustrated in FIG. 1, this is not intended to be limiting. For example, the video-clip server(s) 116 may include additional or alternative components, such as those described below with respect to the computing device 600 of FIG. 6.

As further illustrated in FIG. 1, the video-clip server(s) 116 may be separate or distinct from the game server(s) 126; however, this is not intended to be limiting. In some examples, the video-clip server(s) 116 may be the same or similar servers to the game server(s) 126 (e.g., running as a task on the game server(s) 126). In some examples, the video-clip server(s) 116 may be operated or hosted by a first entity (e.g., a first company) and the game server(s) 126 may be operated or hosted by a second entity (e.g., a second, different company). In such examples, the second entity may be a game developer, and the first entity and the second entity may share data such that the first entity can identify interesting video clips using data received from the second entity. In other examples, the video-clip server(s) 116 and the game server(s) 126 may be operated or hosted by the same entity. In further examples, the video classification system 100 may be implemented completely on a client device 104 and/or one or more of the components and/or functionality thereof shown as being included in a server may be at least partially implemented on the client device 104.

The video-clip server(s) 116 may include one or more application programming interfaces (APIs) to enable communication of information (e.g., game-session video data, noteworthy-clip timestamps, clip-selection data, etc.) with the game server(s) 126 or the client device(s) 104. For example, the video-clip server(s) 116 may include one or more game APIs that interface with the client devices 104 or the game server(s) 126 to receive game-session video data. As a further example, the video-clip server(s) 116 may include one or more APIs that interface with the game engine 128 or the client device(s) 104 for transmitting classified videos. Although different APIs are described herein, the APIs may be part of a single API, two or more of the APIs may be combined, different APIs may be included other than those described as examples herein, or a combination thereof.

As described herein, video clips may be generated based on durations of predicted interest, which may be identified in an unsupervised manner. The video-clip server(s) 116 may receive the video clips based on the durations of predicted interest from the game server(s) 126 or the client device(s) 104. As another example, the video-clip server(s) 116 may receive the clip timestamp data generated by the interest determiner 140 and generate the video clips from game-session video data stored in the data store(s) 124 based on the durations of predicted interest. The video clips might be generated in various contexts, such as when identifying training data to train a classification model or when identifying clips a gamer might want to share or store (e.g., for classification using a classification model). Each of these contexts is described in detail herein.

In one aspect of this disclosure, video clips based on durations of predicted interest may be used to train a classification model. At a high level, a training set of video clips is generated, and features are extracted from the video clips. The features are then clustered to identify clusters or classes having similarities, with each class or cluster having a cluster center. The classes can then be used to categorize video clips by comparing the features of the video clips to the classes, such as by determining a distance of the features from a cluster center. The video-clip server(s) 126 may be used to do so, which include a feature extractor 156, a clustering engine 158, and a classifier 160.

The feature extractor 156 may include instructions that, when executed by a processor(s), cause the processor(s) to, without limitation, obtain features (e.g., feature vectors) from the video clips that can be quantified in some manner for determining a distance between features when clustering. In some embodiments, the feature extractor 156 is a trained feature extractor of a trained image classifier, such as a machine-learning model pre-trained to classify images on an image set. In some examples, the image set may include photographs of the real-world, as opposed to frames of video games. Although FIG. 1 includes an illustration of a neural network, this is not intended to be limiting. For example, the feature extractor 156 may leverage any type of machine learning model to extract features, such as machine learning models using linear regression, logistic regression, decision trees, support vector machine (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short terms memory, Hopfield, Boltzmann, deep belief, deconvolutional, generative adversarial, liquid state machine, etc.), and/or other types of machine learning models.

In some embodiments, the machine-learning model includes a deep convolutional neural network pre-trained on ImageNet or some other image database to classify images into defined classes. Examples of CNNs that might be used in the feature extractor 156 include, without limitation, ResNet50, InceptionV3, VGG16, VGG19, and Xception.

In one aspect, the feature extractor 156 that was trained as part of a larger image classifier is used to generate a feature vector for frames in each duration of predicted interest. The preceding components of the image classifier (e.g., neural network layers) that are used to perform the classification using the feature vectors extracted by the feature extractor 156 may not be used and may not be included on the video-clip server(s) 116. Instead, the feature vectors may be clustered to identify classes in an unsupervised manner.

In some respects, the feature extractor 156 may be used to extract features from each of a determined (e.g., pre-determined) number of frames (e.g., 40 frames) of each video clip. A given clip may include hundreds or thousands of frames, which is typically higher than the determined number of frames. As such, while extracting or copying frames from the clip for feature extraction, frames may be periodically skipped to arrive at a frame-subset having the determined number of frames.

Once the number of frames has been extracted or generated, a feature vector may be generated for each extracted frame. Accordingly, a same number of feature vectors may be generated for each video clip according to the determined number, regardless of the time duration of the video clip. Continuing with this example, the feature extractor 156—running a CNN pre-trained on ImageNet (or some other image database)—may output a feature vector comprising a 2048 element feature set for each frame, which may be concatenated to form a 40×2048 array (e.g., when the determined number of frames extracted is 40).

The array may be communicated to the clustering engine 158, together with other arrays from other game sessions 114. The clustering engine 158 may include instructions that, when executed by a processor(s), cause the processor(s) to, without limitation, apply one or more clustering techniques to the feature set of each frame. For example, the clustering engine 158 may include configuration instructions that specify cluster-size thresholds (e.g., quantity of samples, distance thresholds, etc.), quantities of clusters, and the like. This configuration data may be stored on the video-clip server(s) 116 and may be updated periodically, or the configuration data may be downloaded from another configuration server. As such, each frame may be analyzed independently and assigned a cluster identifier (ID). For example, the clustering engine might apply K-means clustering, Affinity Propagation, Mean Shift, Agglomerative Hierarchical Clustering, DBScan, or Birch. Using one or more of these techniques, the clustering engine 158 identifies clusters of frames having similar feature vectors. The clusters may form the basis for video-clip classes later used for classifying video clips, as will be described with respect to the classifier 160. Each class may include a cluster center of a cluster (or combination of clusters), which may be used in subsequent video-clip classification.

The identified video-clip clusters may each correspond to a respective class. For example, the classes may be provided to a human and/or software labeler (e.g., administrator) to apply a text descriptor. For example, text descriptors for a car-racing game might include "Overtaking," "Racing Around Bends," and "Accident." In another example, text descriptors for a first person shooter game might include "Shooting Indoors," "Sniper," and "Firefight." These examples are not intended to be limiting and the methods and systems described throughout this disclosure may apply to various competitive and/or cooperative games, and eSports games in particular that can include, without limitation, racing, sports simulation, real-time strategy, collectible card game simulations, massively multiplayer online games, platform games, etc. In addition to or instead of labeling the classes, a human and/or software may merge clusters into the same classes, assign clusters to classes, and/or delete clusters from classes for the trained classification model.

Once the video-clip classes have been identified using at least the clustering engine 158, given a new sample (e.g., a new video clip of a new gameplay session), the classifier 160 may use the trained classification model to determine whether the new sample belongs to one or more of the classes. For example and without limitation, the classifier 160 may include instructions that, when executed by a processor(s), cause the processor(s) to determine whether a feature-set distance of each frame of the new sample satisfies one or more parameters or thresholds for belonging to a class. To do so, the new sample may be processed by the feature extractor 156—using the determined number of frames—to extract a feature vector for each frame. Each of the feature vectors of the new sample may be compared to features of the classes by calculating its distance from the cluster centers of the various classes. The classifier 160 is depicted as a component of the video-clip server(s) 116, and in other aspects, the classifier 160 may be a component of the game server(s) 126 or the client device(s) 104. For example, one or more of the components of the video-clip server(s) 116 may be part of the game engine 128, the game application 106, and/or may be separate from those components.

The classifier 160 may classify a frame as belonging to an existing class when the feature-set distance of the frame feature vector is closer to the cluster center of that existing class than any of the other cluster centers. In that case, the frame may be assigned a unique class ID (e.g., text label) associated with the existing class in which it has been classified. The classifier 160 may apply other rules, as well. For example, the classifier 160 may include a distance threshold, and if the feature-set distance exceeds the distance threshold for all clusters, then a new class may be created for classifying the frame if a sufficient number of frames also exceed the distance threshold (e.g., and are also sufficiently similar to one another). The distance threshold might be empirically set as a single value (not a vector).

In a further examples, the classifier 160 may apply a frame majority rule or some other frame-based metric to classify a video clip. For instance, the frame majority rule might specify that a video clip is classified into the class in which a majority of frames are classified. For example, if a clip contains 36 frames belonging to a first class and 4 frames belonging to a second class, the video clip may be classified under the first class because the majority of frames are in the first class, in which case the video clip may be associated with the text descriptor created for the first class. If a majority of the frames are outliers and do not satisfy the distance threshold, or other rules, such that a new class is created, a unique ID or text descriptor might not yet exist for the new class. As such, the new class may be reviewed by a human labeler (e.g., an administrator) for adding a text descriptor. In some examples, a video clip may be assigned more than one class, such as a secondary class that has the second most frames belonging to that class, and/or a class that has at least a threshold percentage of frames belonging to the class.

Once a new sample has been classified, the video-clip server(s) 116 may communicate, to the game server(s) 16 and/or the client devices 104, an indication of whether the new sample was classified under an existing class or a new class, as well as the text descriptor for the class. In addition, the video-clip server(s) 116 may communicate the video clip (e.g., duration of predicted interest) to the game server(s) and/or the client devices 104 to be presented on the display 108. The video clip may then be selected by a user for sharing or storing, and the decision of the user may be provided as feedback to the classifier 160 to refine the classification model.

The present disclosure provides for video-clip classification, which may include diverse visual content over a number of frames. Furthermore, embodiments of this disclosure allow for the identification and creation of new classes not in the classification model, which may be used to update the classification model without having to re-cluster. For example, if a frame is not sufficiently similar to any of the existing classes (e.g., the distance metric exceeds a threshold value for each class), the frame may be assigned to a new cluster and/or class, which may be used for future classification of video clips. As such, new classes may be defined by outliers from existing classes.

Furthermore, using the approaches described in this disclosure, clusters or classes may be used across users for the same game (e.g., with each set of video clips corresponding to a different user and/or game session), without having cluster the entire data set at once to abstract the classes across multiple users and/or game sessions. For example, features of clusters or classes (e.g., cluster centers) may function as a new feature for clustering in unsupervised training of video clip classification. As such, clustering and classification could be performed on a per-game basis, on a per-user basis, across multiple games and/or genres, per geographical region, per skill level, etc.

Once classified, a new sample can used for various purposes. Examples include tagging or labeling the video clips for storing and/or sharing (e.g., selectively by a user via a graphical user interface). The system may track user feedback on the classes provided by a gamer and/or an administrator to update the classes, such as the number of classes and/or clusters. For example, the system may merge clusters based on a user assigning video clips from different classes to the same class or otherwise indicating two classes should be the same class. As another example, the system may form multiple clusters from a cluster based on a user assigning a video clip of the cluster to a new class or otherwise indicating one class should be multiple classes. In this respect, the system can improve over time.

A video-clip manager 130 may be configured to provide classified video clips to the client devices 104. For example, the video-clip manager 130 may be configured to receive video-clip classification information from the classifier 160, such as the video clip (e.g., duration of predicted interest), the class, and the text descriptor associated with the class. The video-clip manager 130 may be also configured to transmit the video-clip classification information to the client devices 104 to be presented on the display 108 for selection by the user. For example, the video-clip manager 130 may transmit the video-clip classification information at the conclusion of a gameplay session. In addition, the video-clip manager 130 may be configured to receive from the client devices 104 user feedback indicating whether a duration of predicted interest was selected for sharing or storage and to transmit the user feedback to the classifier 160, which may use the user feedback to refine the classification model. In some examples, the video-clip manager may be at least partially implemented on one or more of the client devices 104 and/or the game server(s) 126 (e.g., as part of the game application 106 and/or game engine 128).

Communication interface 122 may include one or more components and features for communicating across one or more networks, such as the network(s) 102. The communication interface 122 may be configured to communicate via any number of network(s) 102, described herein. For example, to communicate in the video classification system 100 of FIG. 1, the video-clip server(s) 116 may communicate over a LAN and/or the Internet with other video-clip server(s), the game server(s) 126, and/or the client devices 104. As indicated above, the video-clip server(s) 116 may exchange various information with the game server(s) and the client device(s), including video clips, a classification of video clips, and an indication of whether a video clip was shared or stored by a user.

The game server(s) 126 may include one or more servers (e.g., dedicated game servers) for storing, hosting, managing, and, in some examples, rendering a game. In some examples, first game server(s) 126 may be used to create, update, and modify a game (e.g., the program code of the game), and second game server(s) 126 may be used to host the game (e.g., as dedicated game servers). Although only a few components and/or features of the game server(s) 126 are illustrated in FIG. 1, this is not intended to be limiting. For example, the game server(s) 126 may include additional or alternative components, such as those described below with respect to the computing device 600 of FIG. 6.

The game server(s) 126 may include one or more APIs to enable game play by the client device(s) 104 and/or to enable communication of information (e.g., user profiles, user category profiles, game session data, etc.) with the profile server(s) 116. For example, the game server(s) 126 may include one or more game APIs that interface with the game applications 106 of the client devices 104 to enable game play by the client devices 104. As another example, the game server(s) 126 may include one or more game session APIs that interface with the feature extractor 156 to pass durations of predicted interest to the video-clip server(s) 116 for classification. As a further example, the game server(s) 126 may include one or more APIs that interface with the classifier 160 to receive the classified video clip for transmitting to the client device 104. Although different APIs are described herein, the APIs may be part of a single API, two or more of the APIs may be combined, different APIs may be included other than those described as examples herein, or a combination thereof.

The game server(s) 126 may include the game engine 128. The game engine 128 may include the functionality of a game that enables a game to be played by one or more users over a network. The game engine 128 may include a rendering engine, an audio engine, a physics engine, an animation engine, an artificial intelligence engine, a networking engine, a streaming engine, a memory management engine, and/or other components or features. The game engine 128 may be used to generate some or all of the game session data during a game session.

Communication interface 132 may include one or more components and features for communicating across one or more networks, such as the network(s) 102. The communication interface 132 may be configured to communicate via any number of network(s) 102, described herein. For example, to communicate in the video classification system 100 of FIG. 1, the game server(s) 126 may communicate over a LAN with other game server(s) and/or over the Internet with other game server(s) 126, the profile server(s) 116, and/or the client devices 104.

Figure 2:
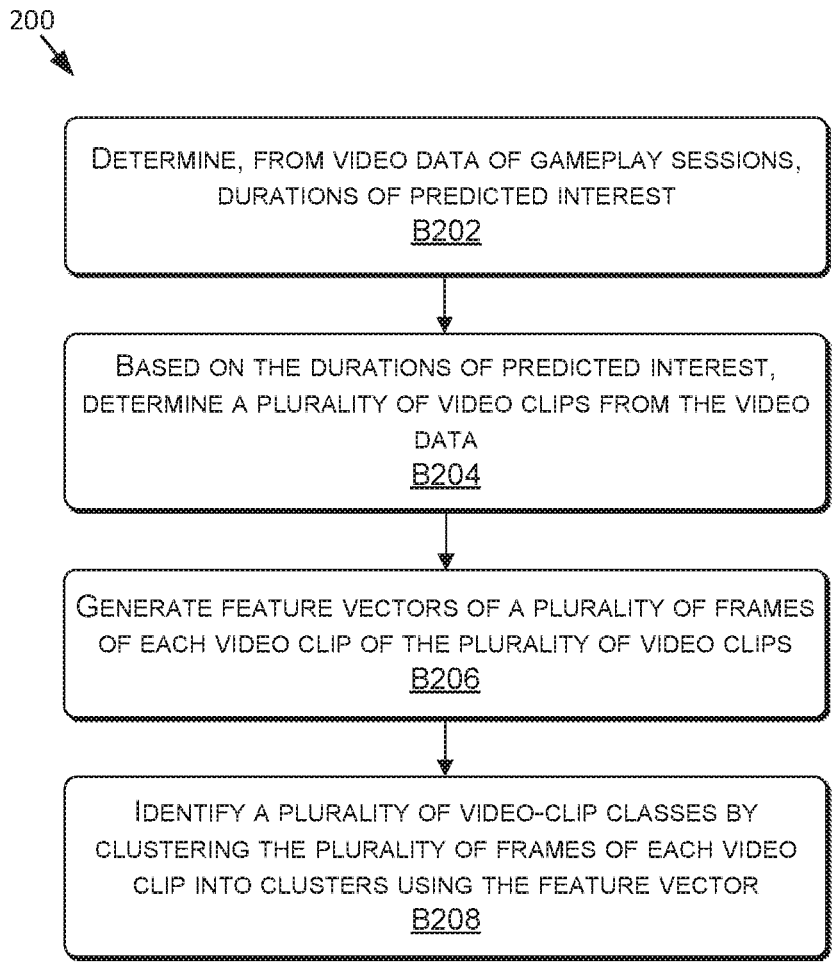
FIG. 2 is a flow diagram showing a method for identifying video-clip classes, in accordance with some embodiments of the present disclosure.

Now referring to FIG. 2, each block of method 200, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 200 is described, by way of example, with respect to the system of FIG. 1. However, this method may additionally or alternatively be executed by any one system, or any combination of systems, including, but not limited to, those described herein.

FIG. 2 is a flow diagram showing a method 200 for identifying video-clip classes, in accordance with some embodiments of the present disclosure. The method 200, at block B202, includes determining, from gameplay video of gameplay sessions, durations of predicted interest, each duration corresponding to user selections of one or more input devices made during a gameplay session of the gameplay sessions. In addition, at block B204, based on the durations of predicted interest, a plurality of video clips of the gameplay video are determined.

For example, as part of block B202, durations of predicted interest may be determined by the interest determiner 140 based on various game data captured by the game data capturer 138, such as by analyzing input-device data representing user inputs to one or more of a keyboard, a mouse, a game-console controller, or a touchscreen and/or visual data of gameplay. Furthermore, the durations of predicted interest may be based on one or more of: a rate at which one or more buttons on the one or more input devices are depressed in a given time, a speed at which the one or more buttons are depressed, or a classification of the one or more buttons that are depressed.

In embodiments, durations of predicted interest may be determined by calculating a running input-device-selection metric over a time duration correlating with a duration of predicted interest. The running input-device-selection metric may be based on a plurality of fast cycles, during which a speed of the user selections continuously exceeds a predetermined speed threshold. In addition, the plurality of fast cycles may be used to identify a plurality of time segments within the time duration that are used to identify the plurality of video clips. In a further embodiment, durations of predicted interest may be determined by calculating a running input-device-selection metric over a time duration by applying an algorithm to attributes of a plurality of fast cycles including a maximum speed of input-device activation during a fast cycle, a quantity of inputs that are both activated in the fast cycle and classified in a pre-determined group of inputs, and a total quantity of input-device activations included in the fast cycle. In that case, the plurality of fast cycles are used to identify a plurality of time segments within the time duration that are used to identify the plurality of video clips.

As part of block B204, the plurality of video clips may be generated by the video-clip server(s) 116, the client devices 104, or the game server(s). For example, if time segment 150(A) is deemed a duration of predicted interest, then a video clip of Frames 200-275 (or copies thereof) may be generated or extracted by the client devices 104, the game server(s) 126, or the video-clip server(s).

Block B206 includes generating feature vectors of a plurality of frames of each video clip of the plurality of video clips. For example, frames may be generated from each video clip, provided by the clustering engine 158 as inputs to the feature extractor 156 of a trained image classifier. The feature extractor 146 generates outputs that are representative of the feature vectors. As described herein, in some examples, the feature extractor 156 may be a deep CNN trained on a non-game-specific image data set, such as ImageNet.

Block B208 includes identifying a plurality of video-clip classes by clustering the plurality of frames of each video clip into clusters using the feature vectors, each video-clip class including a subset of the video clips. For example, the clustering engine 158 may apply one or more clustering techniques, such as K-means, DMScan, or Agglomerative, on a per-frame basis to identify one or more subsets with similar features. The video-clip classes can then be used to classify a new sample video clip.

Although not explicitly depicted in FIG. 2, the plurality of video clips might be a first plurality of video clips of a video game (e.g., a same video game). Furthermore, identifying the plurality of video-clip classes might include a first step of clustering a plurality of frames of each video clip of a second plurality of video clips of gameplay of the video game into clusters using feature vectors of the plurality of frames of the second plurality of video clips. A second step may include aggregating cluster centers of the clusters of the first plurality of video clips and cluster centers of the clusters of the second plurality of video clips into a collection of cluster centers, wherein at least one of the plurality of video-clip classes is based on (e.g., assigned to) a at least one of the cluster centers.

Figure 3:
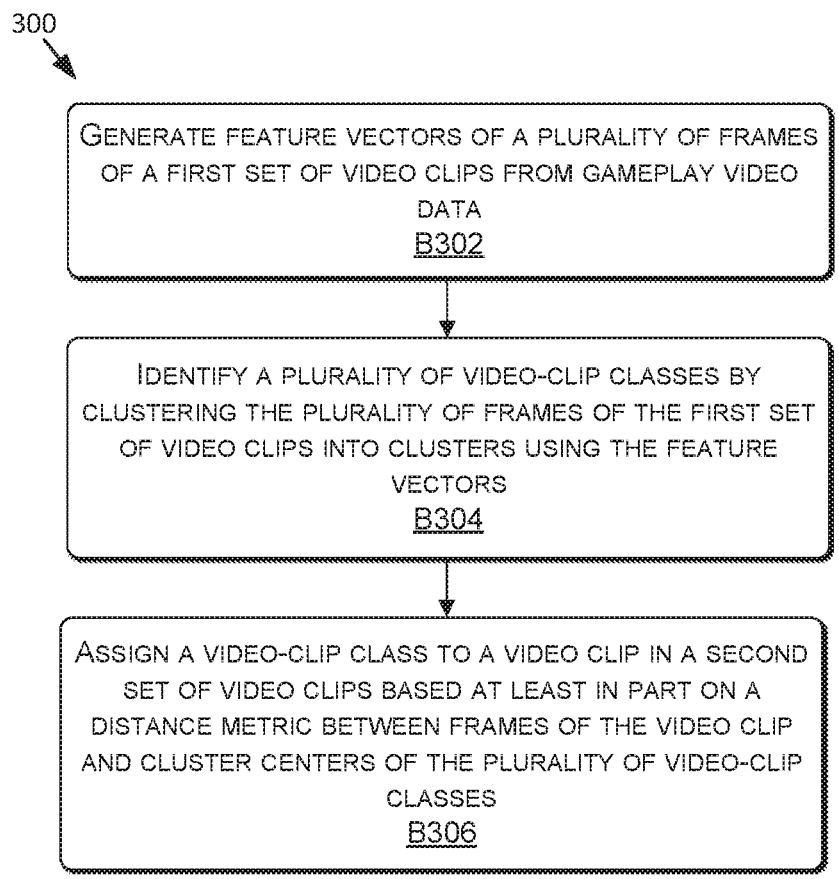
FIG. 3 is a flow diagram showing a method for classifying a video clip, in accordance with some embodiments of the present disclosure.

Now referring to FIG. 3, each block of method 300, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 300 is described, by way of example, with respect to the system of FIG. 1. However, this method may additionally or alternatively be executed by any one system, or any combination of systems, including, but not limited to, those described herein.

FIG. 3 is a flow diagram showing a method 300 for classifying a video clip, in accordance with some embodiments of the present disclosure. The method 300, at block B302, includes generating feature vectors of a plurality of frames of a first set of video clips from gameplay video. The first set of video clips may result from one or more gameplay sessions run in various contexts. For example, the gameplay sessions result from one or more administrators of the video classification system 100 playing one or more games in order to generate training data for training the system 100. The gameplay sessions might also result from users or gamers playing one or more games. Furthermore, the gameplay sessions might result from both administrators and users playing one or more games. As described above, the gameplay video may be stored in local storage 136, in data store(s) 134, and/or in data store(s) 124, and in one embodiment, the feature extractor 156 receives frames of the gameplay video, or a portion thereof, and generates feature vectors for frames included among the gameplay video.

Block B304 includes identifying a plurality of video-clip classes by clustering the plurality of frames of the first set of video clips into groups using the feature vectors, each video-clip class including a cluster center. For example, the clustering engine 158 may apply one or more clustering techniques, such as K-means, DMScan, or Agglomerative, on a per-frame basis to identify one or more subsets with similar features, each subset including a cluster center.

At block B306, a video-clip class is assigned to a video clip in a second set of video clips based at least in part on a distance metric between frames of the video clip and the cluster centers of the plurality of video-clip classes. For example, per-frame feature vectors may be extracted from the video clip, and a similarity of the feature vectors to the plurality of video-clip classes may be assessed by calculating a feature-set distance relative to cluster centers.

Continuing with B306, assigning may include determining a first subset of the frames of the video clip each belong to the video-clip class based on the distance metric for each frame in the first subset of the frames and determining a second subset of the frames of the video clip do not belong to the video-clip class based on the distance metric for each frame in the second subset of the frames. In that case, the video clip may be assigned the video-clip class based on a quantity of frames in the first subset being greater than a quantity of frames in the second subset. In another example, the distance metric for each frame in the first subset of the frames is assessed with respect to a first cluster center of the first video-clip class, and the distance metric for each frame in the second subset of the frames is assessed with respect to a second cluster center of the second video-clip class. In that case, the video-clip class is the first video-clip class based on a quantity of frames in the first subset being greater than a quantity of frames in the second subset. In another example, the video-clip class is a first video-clip class of the plurality of video-clip classes and is assigned to the video clip based on a first quantity of the frames of the video clip that have the distance metric within a threshold distance from the cluster center of the first video-clip class being greater than a second quantity of the frames of the video clip that have the distance metric within the threshold distance from the cluster center of a second video-clip class.

In a further example, the video-clip class is one of the plurality of video-clip classes based on the distance metric for a majority of the frames of the video clip being within a threshold distance from the cluster center of the video-clip class. Alternatively, the video-clip class may be a new class that is different than the plurality of video-clip classes based on a quantity of the frames of the video clip that have the distance metric for the frame exceed a threshold distance from the cluster center of each of the plurality of video-clip classes.

Figure 4:
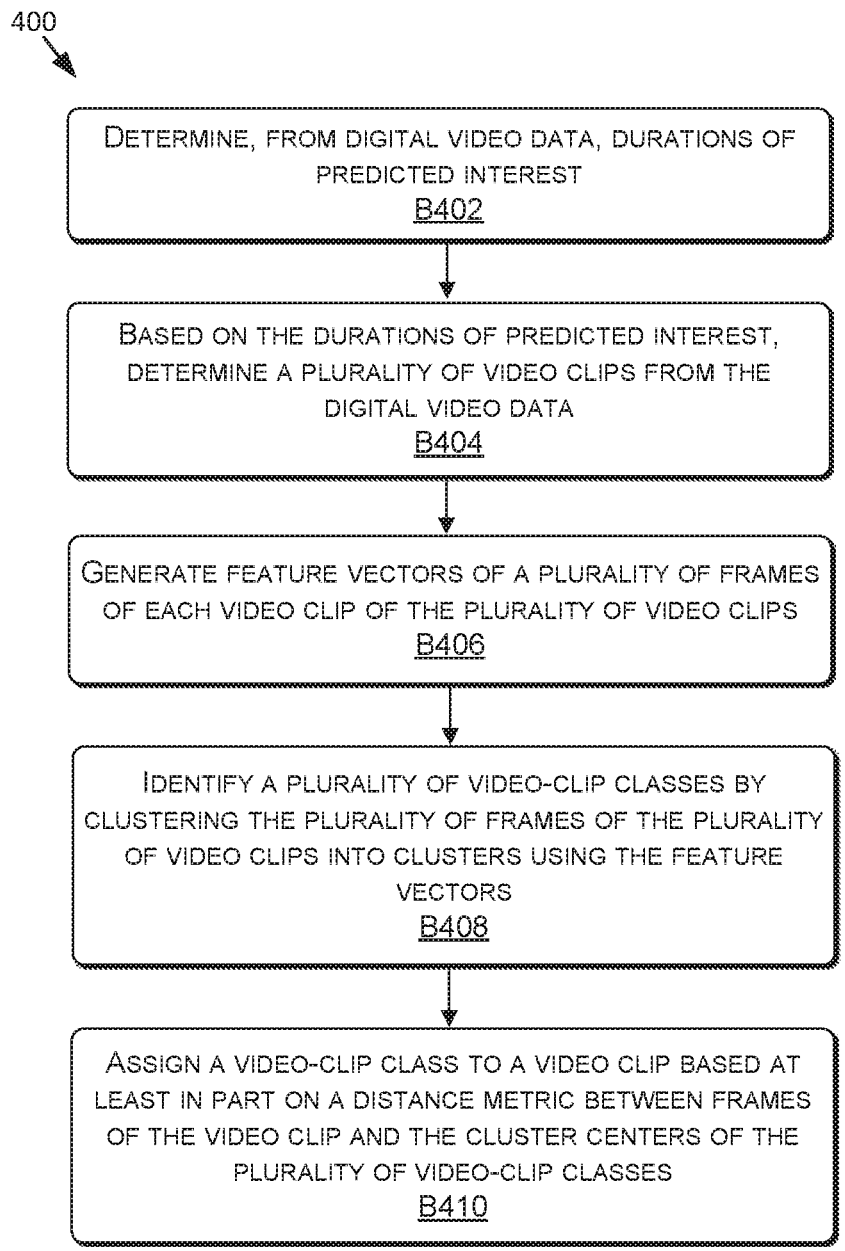
FIG. 4 is a flow diagram showing a method for classifying a video clip, in accordance with some embodiments of the present disclosure.

Now referring to FIG. 4, each block of method 400, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 400 is described, by way of example, with respect to the system of FIG. 1. However, this method may additionally or alternatively be executed by any one system, or any combination of systems, including, but not limited to, those described herein.

FIG. 4 is a flow diagram showing a method 400 for classifying a video clip, in accordance with some embodiments of the present disclosure. The method 400, at block B402, includes determining, from digital video, durations of predicted interest. The digital video may be a video game or may include some other content, such as live or recorded sporting events or other streamed content. As previously described, the durations of predicted interest may be determined by the interest determiner 140, or some similar module of a set-top box or other streaming device.

At step B404, based on the durations of predicted interest, a plurality of video clips of the digital video are determined. For example, video clips may be generated from video content corresponding with the durations of predicted interest. Step B406 includes generating feature vectors of a plurality of frames of each video clip of the plurality of video clips, such as by the feature extractor 156 executing any of the various operations described in this disclosure.

Step B408 includes identifying a plurality of video-clip classes by clustering the plurality of frames of the plurality of video clips into clusters using the feature vectors, each video-clip class including a cluster center. For example, the clustering engine 158 may cluster the frames and generate cluster centers. At step B410, a video-clip class is assigned to a video clip based at least in part on a distance metric between frames of the video clip and the cluster centers of the plurality of video-clip classes. For example, the classifier 160 may assign the video clip to one of the plurality of video-clip classes or a new video clip class, depending on rules applied to the distance metrics of the video clip.

Figure 5:
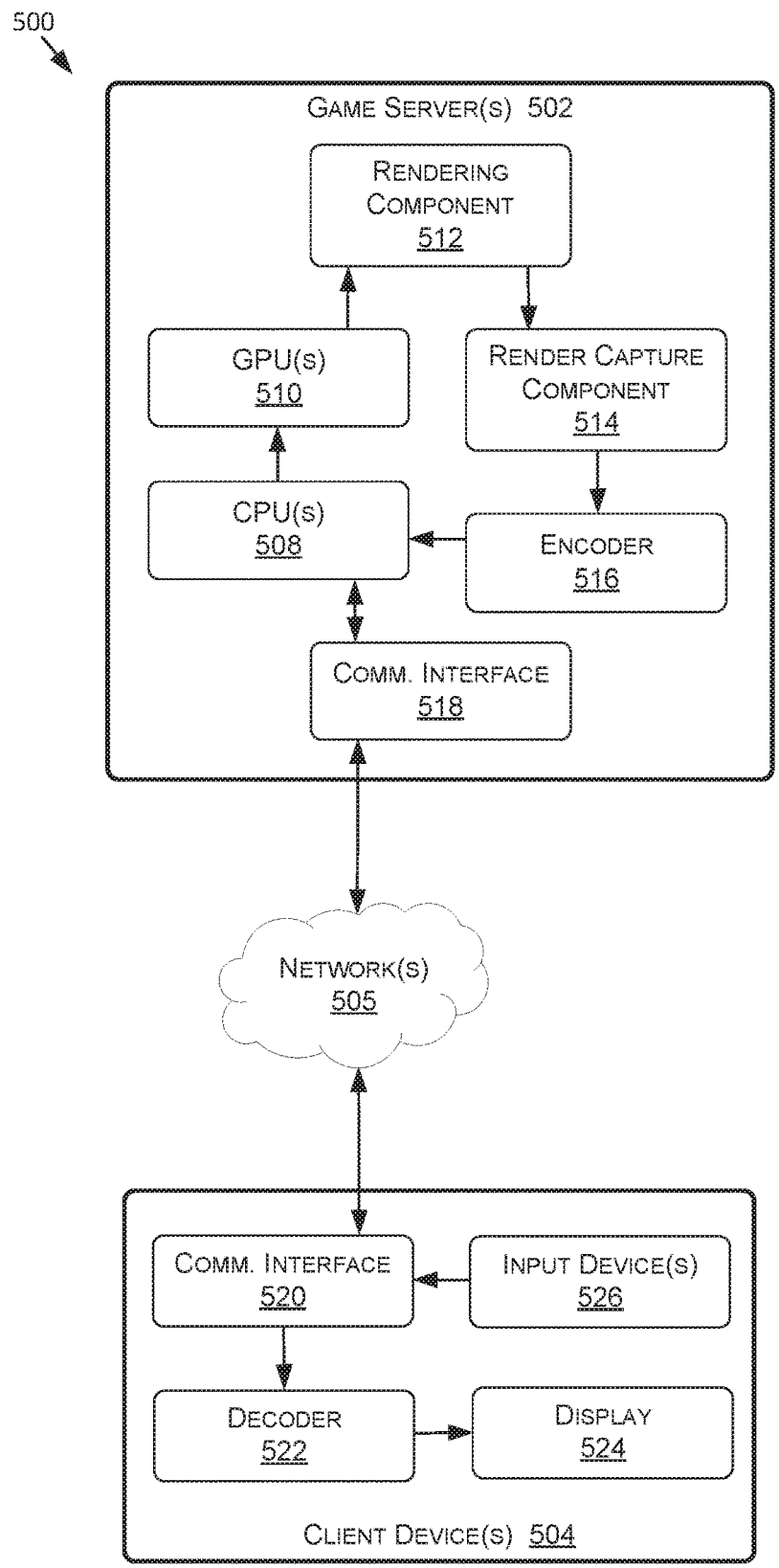
FIG. 5 is an example system diagram for a game streaming system, in accordance with some embodiments of the present disclosure.

Now referring to FIG. 5, FIG. 5 is an example system diagram for a game streaming system 500, in accordance with some embodiments of the present disclosure. FIG. 5 includes game server(s) 502 (which may include similar components, features, and/or functionality to the game server(s) 126 of FIG. 1 and/or the computing device 600 of FIG. 6), client device(s) 504 (which may include similar components, features, and/or functionality to the client devices 104 of FIG. 1 and/or the computing device 600 of FIG. 6), and network(s) 506 (which may be similar to the network(s) 102 of FIG. 1). In some embodiments of the present disclosure, the system 500 may be implemented.

In the system 500, for a game session, the client device(s) 504 may only receive input data in response to inputs to the input device(s), transmit the input data to the game server(s) 502, receive encoded display data from the game server(s) 502, and display the display data on the display 524. As such, the more computationally intense computing and processing is offloaded to the game server(s) 502 (e.g., rendering of the game session is executed by the GPU(s) of the game server(s) 502). In other words, the game session is streamed to the client device(s) 504 from the game server(s) 502, thereby reducing the requirements of the client device(s) 504 for graphics processing and rendering.

For example, with respect to an instantiation of a game session, a client device 504 may be displaying a frame of the game session on the display 524 based on receiving the display data from the game server(s) 502. The client device 504 may receive an input to one of the input device(s) and generate input data in response. The client device 504 may transmit the input data to the game server(s) 502 via the communication interface 520 and over the network(s) 506 (e.g., the Internet), and the game server(s) 502 may receive the input data via the communication interface 518. The CPU(s) may receive the input data, process the input data, and transmit data to the GPU(s) that causes the GPU(s) to generate a rendering of the game session. For example, the input data may be representative of a movement of a character of the user in a game, firing a weapon, reloading, passing a ball, turning a vehicle, etc. The rendering component 512 may render the game session (e.g., representative of the result of the input data) and the render capture component 514 may capture the rendering of the game session as display data (e.g., as image data capturing the rendered frame of the game session). The encoder 516 may then encode the display data to generate encoded display data and the encoded display data may be transmitted to the client device 504 over the network(s) 506 via the communication interface 518. The client device 504 may receive the encoded display data via the communication interface 520 and the decoder 522 may decode the encoded display data to generate the display data. The client device 504 may then display the display data via the display 524.

Figure 6:
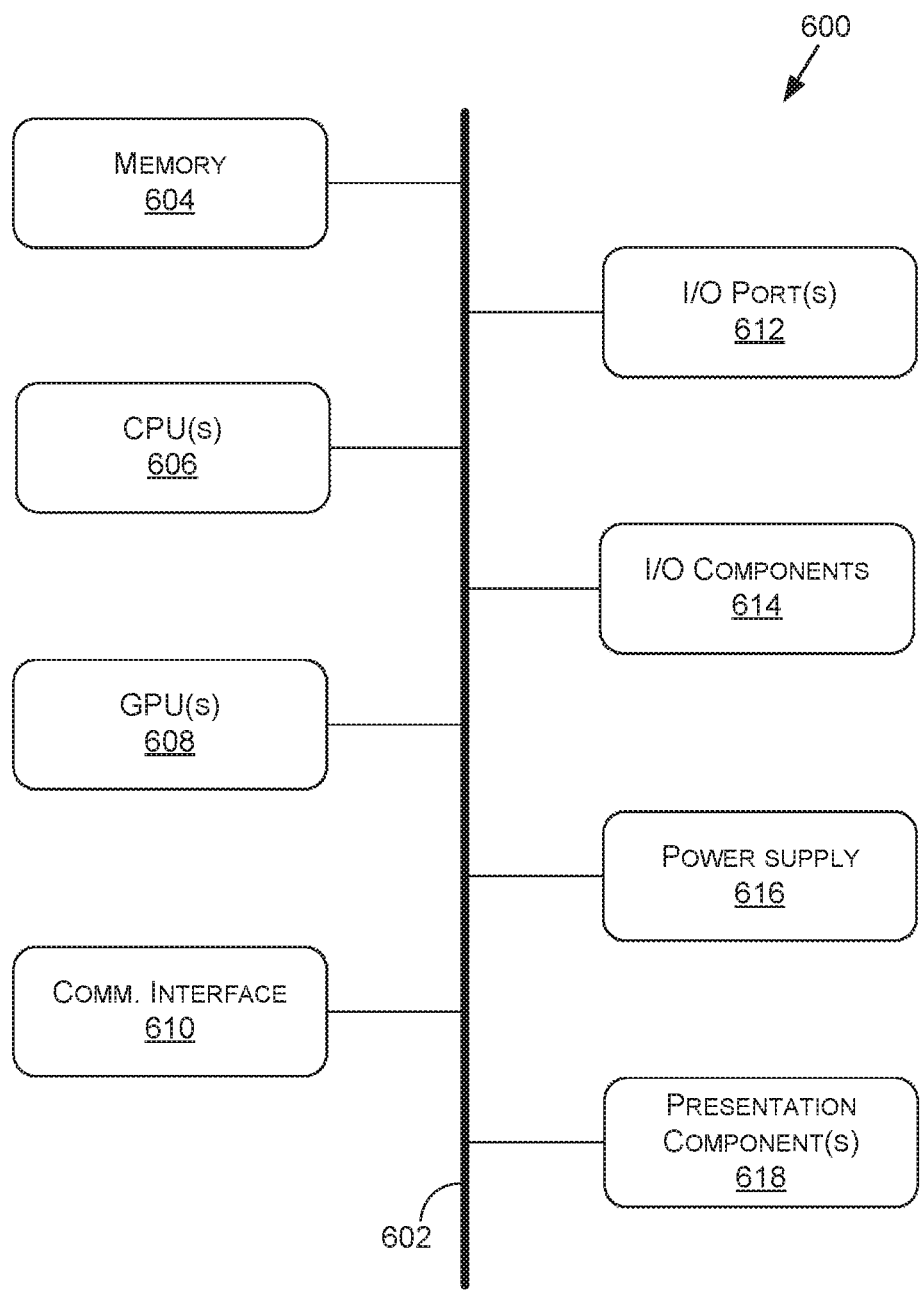
FIG. 6 is a block diagram of an example computing environment suitable for use in implementing some embodiments of the present disclosure.

FIG. 6 is a block diagram of an example computing device 600 suitable for use in implementing some embodiments of the present disclosure. Computing device 600 may include a bus 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, and one or more presentation components 618 (e.g., display(s)).

Although the various blocks of FIG. 6 are shown as connected via the bus 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "handheld device," "game console," "electronic control unit (ECU)," "virtual reality system," and/or other device or system types, as all are contemplated within the scope of the computing device of FIG. 6.

The bus 602 may represent one or more busses, such as an address bus, a data bus, a control bus, or a combination thereof. The bus 602 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 606 may be configured to execute the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an ARM processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

The GPU(s) 608 may be used by the computing device 600 to render graphics (e.g., 3D graphics). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data. The display memory may be included as part of the memory 604. The GPU(s) 608 may include two or more GPUs operating in parallel (e.g., via a link). When combined together, each GPU 608 may generate pixel data for different portions of an output image or for different output images (e.g., a first GPU for a first image and a second GPU for a second image). Each GPU may include its own memory, or may share memory with other GPUs.

In examples where the computing device 600 does not include the GPU(s) 608, the CPU(s) 606 may be used to render graphics.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including handheld devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   determining, using one or more processors and based on video data of gameplay sessions, one or more durations of predicted interest, at least one duration of the one or more durations corresponding to input provided by a user via one or more input devices during a gameplay session of the gameplay sessions;
   determining, using the one or more processors and based on the one or more durations of predicted interest, a plurality of video clips from the video data;
   generating, using the one or more processors, one or more feature vectors of a plurality of frames of at least one video clip of the plurality of video clips; and
   identifying, using the one or more processors, a plurality of video-clip classes by clustering the plurality of frames of the at least one video clip into clusters using the one or more feature vectors, at least one video-clip class from the plurality of video-clip classes corresponding to a subset of the video clips.

2. The method of claim 1, wherein the determining one or more durations of predicted interest is based on analyzing input-device data representing user inputs to one or more of a keyboard, a mouse, a game-console controller, or a touchscreen.

3. The method of claim 1, wherein the determining one or more durations of predicted interest is based on one or more of:
   a rate at which one or more buttons on the one or more input devices are depressed in a given time,
   a speed at which the one or more buttons are depressed, or
   a classification of the one or more buttons that are depressed.

4. The method of claim 1, further comprising calculating a running input-device-selection metric over a time duration correlating with a duration of predicted interest, wherein the running input-device-selection metric is based on a plurality of fast cycles during which a speed of user selections continuously exceeds a predetermined speed threshold, and wherein the plurality of fast cycles are used to identify a plurality of time segments within the time duration that are used to identify the plurality of video clips.

5. The method of claim 1, further comprising calculating a running input-device-selection metric over a time duration by applying an algorithm to attributes of a plurality of fast cycles including a maximum speed of input-device activation during a fast cycle, a quantity of inputs that are both activated in the fast cycle and classified in a pre-determined group of inputs, and a total quantity of input-device activations included in the fast cycle, wherein the plurality of fast cycles are used to identify a plurality of time segments within the time duration that are used to identify the plurality of video clips.

6. The method of claim 1, wherein the generating the one or more feature vectors includes providing the plurality of frames as inputs to a feature extractor of a trained image classifier to generate outputs of the feature extractor that are representative of the one or more feature vectors, and wherein the clustering is performed on individual frames of the plurality of frames on a per-frame basis using a corresponding feature vector.

7. The method of claim 1, further comprising assigning a class to a video clip based at least in part on a distance metric between frames of the video clip and the plurality of frames.

8. The method of claim 1, wherein the plurality of video clips are a first plurality of video clips of a gaming application and the identifying the plurality of video-clip classes includes:
   clustering a plurality of frames of each video clip of a second plurality of video clips of gameplay of the gaming application into clusters using feature vectors of the plurality of frames of the second plurality of video clips; and
   aggregating cluster centers of the clusters of the first plurality of video clips and cluster centers of the clusters of the second plurality of video clips into a collection of cluster centers, wherein at least one of the plurality of video-clip classes is based on at least one cluster center from the collection of the cluster centers.

9. A method comprising:
   generating, using one or more processors, one or more feature vectors of a plurality of frames of a first set of video clips from gameplay video data;
   identifying, using the one or more processors, a plurality of video-clip classes by clustering the plurality of frames of the first set of video clips into clusters using the one or more feature vectors, each video-clip class including a cluster center; and
   assigning, using the one or more processors, a video-clip class to a video clip in a second set of video clips based at least in part on a distance metric between frames of the video clip and the cluster centers of the plurality of video-clip classes.

10. The method of claim 9, wherein the assigning comprises:
   determining a first subset of the frames of the video clip each belong to the video-clip class based on the distance metric for each frame in the first subset of the frames; and
   determining a second subset of the frames of the video clip do not belong to the video-clip class based on the distance metric for each frame in the second subset of the frames, wherein the video clip is assigned the video-clip class based on a quantity of frames in the first subset being greater than a quantity of frames in the second subset.

11. The method of claim 9, wherein the assigning comprises:
   determining a first subset of the frames of the video clip each belong to a first video-clip class of the video-clip classes based on the distance metric for each frame in the first subset of the frames with respect to a first cluster center of the first video-clip class; and
   determining a second subset of the frames of the video clip each belong to a second video-clip class of the video-clip classes based on the distance metric for each frame in the second subset of the frames with respect to a second cluster center of the second video-clip class, wherein the video-clip class is the first video-clip class based on a quantity of frames in the first subset being greater than a quantity of frames in the second subset.

12. The method of claim 9, wherein the video-clip class is one of the plurality of video-clip classes based on the distance metric for a majority of the frames of the video clip being within a threshold distance from the cluster center of the video-clip class.

13. The method of claim 9, wherein the video-clip class is a first video-clip class of the plurality of video-clip classes and is assigned to the video clip based on a first quantity of the frames of the video clip that have the distance metric within a threshold distance from the cluster center of the first video-clip class being greater than a second quantity of the frames of the video clip that have the distance metric within the threshold distance from the cluster center of a second video-clip class.

14. The method of claim 9, wherein the video-clip class is a new class that is different than the plurality of video-clip classes based on a quantity of the frames of the video clip that have the distance metric for the frame exceed a threshold distance from the cluster center of each of the plurality of video-clip classes.

15. A method comprising:
   determining, using one or more processors and based on digital video data, one or more durations of predicted interest;
   determining, using the one or more processors and based on the durations of predicted interest, a plurality of video clips from the digital video data;
   generating, using the one or more processors, one or more feature vectors of a plurality of frames of each video clip of the plurality of video clips;
   identifying, using the one or more processors, a plurality of video-clip classes by clustering the plurality of frames of the plurality of video clips into clusters using the feature vectors, each video-clip class corresponding to a cluster center; and
   assigning, using the one or more processors, a video-clip class to a video clip based at least in part on a distance metric between frames of the video clip and the cluster centers of the plurality of video-clip classes.

16. The method of claim 15, wherein the feature vectors are generated using an automatic feature extractor of a trained image classifier.

17. The method of claim 15, wherein the feature vectors of the plurality of frames are clustered on a per-frame basis using a feature vector for each of the frames.

18. The method of claim 15, wherein the video-clip class is a new class that is different than the plurality of video-clip classes based on a quantity of the frames of the video clip that have the distance metric for the frame exceed a threshold distance from the cluster center of each of the plurality of video-clip classes.

19. The method of claim 15, wherein the video-clip class is one of the plurality of video-clip classes based on the distance metric for a majority of the frames of the video clip being within a threshold distance from the cluster center of the video-clip class.

20. The method of claim 15, wherein each of the plurality of video clips is of a same software application.

* * * * *